Patented Aug. 28, 1923.

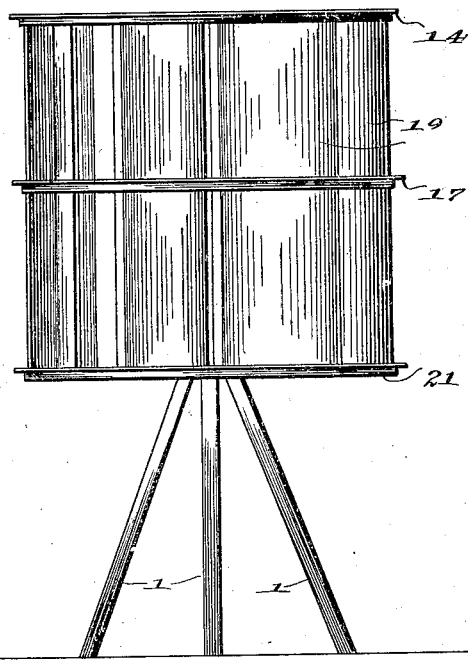
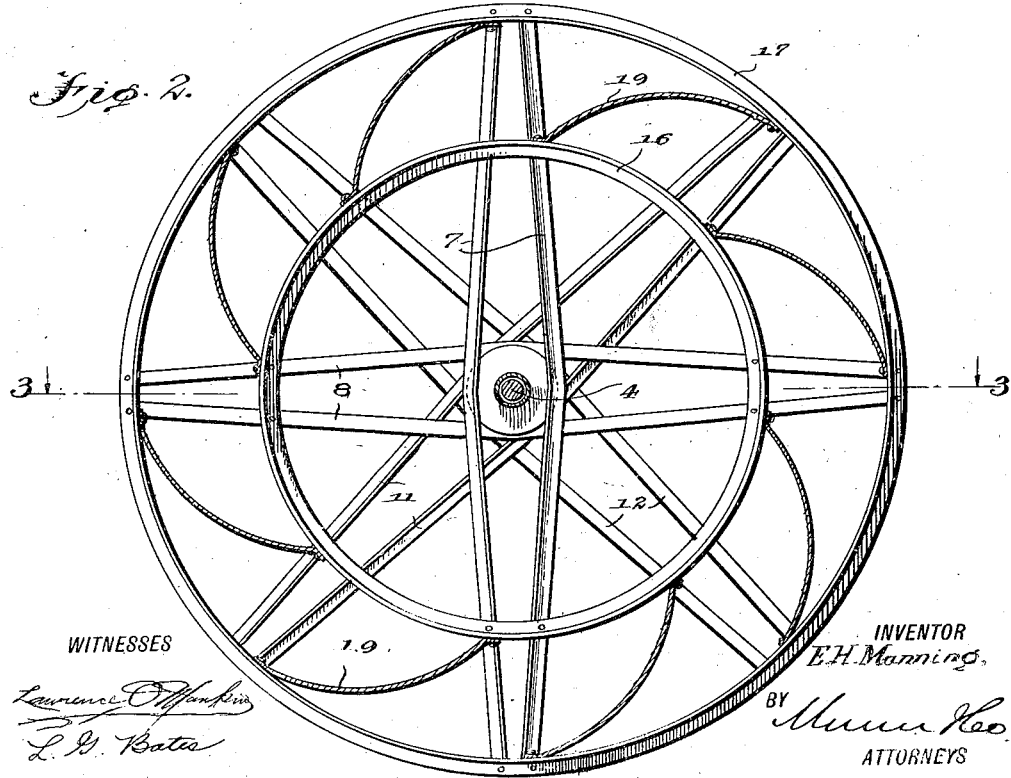

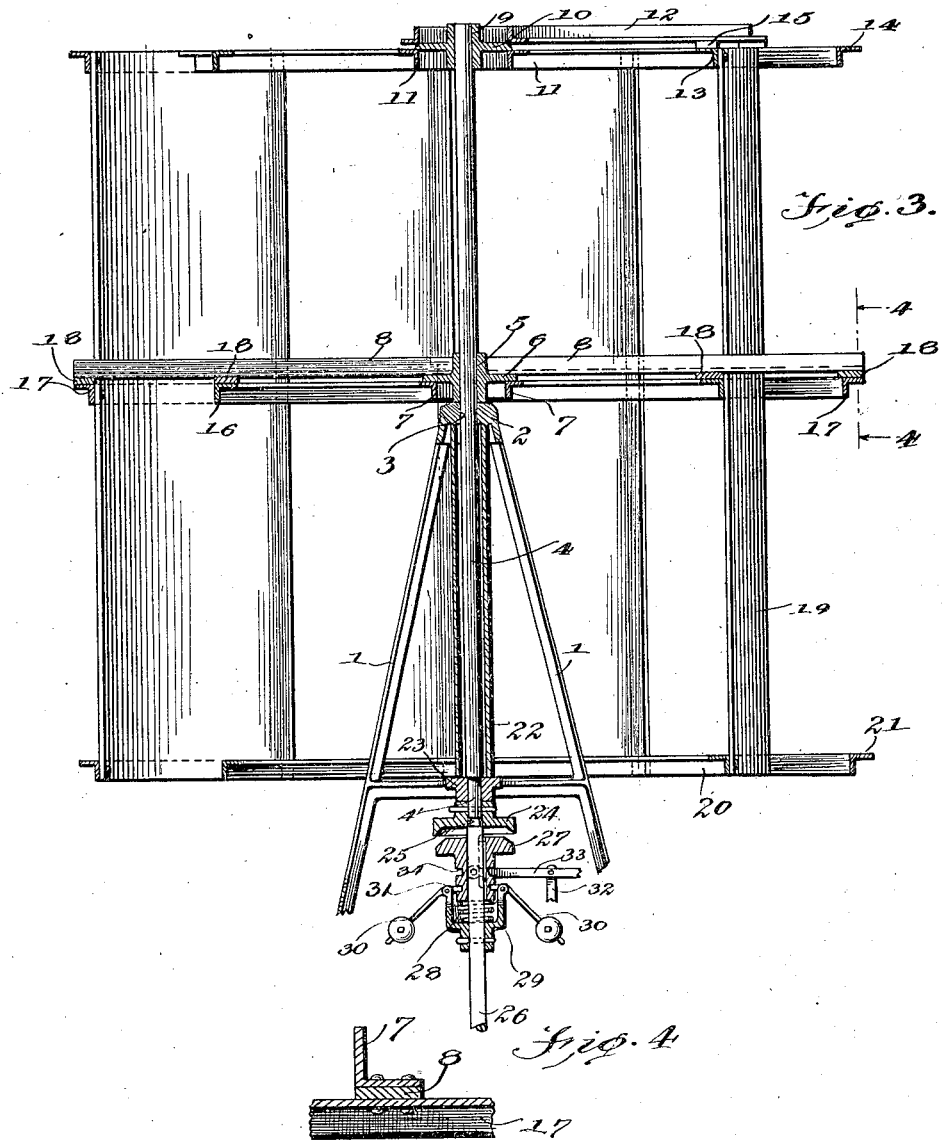

1,466,026

UNITED STATES PATENT OFFICE.

EBENEZER H. MANNING, OF ELKHART, INDIANA.

WIND TURBINE.

Application filed February 24, 1922. Serial No. 538,915.

*To all whom it may concern:*

Be it known that I, EBENEZER H. MANNING, a citizen of the United States, and resident of Elkhart, in the county of Elkhart and State of Indiana, have invented certain new and useful Improvements in Wind Turbines, of which the following is a specification.

My invention relates to wind turbines and it consists in the combinations, constructions and arrangements herein described and claimed.

An object of my invention is to provide a wind power device which has facilities for husbanding and utilizing to the fullest possible extent in the development of power all the effective force of air currents of varying velocities.

A further object of my invention is to provide a device which is adapted to be actuated by air currents of any appreciable velocity, irrespective of the direction of movement of the air currents.

A further object of my invention is to provide a wind power device having vanes relatively arranged to deflect the air currents impinging thereagainst in such manner as to retain the air currents within the limits of the device until the effective force of such air currents has been spent in effecting the rotation of a rotor comprised in the device.

A still further object of my invention is to provide a device of the character described which includes a rotor adapted to be acted upon with full efficiency at all times, irrespective of the direction of the wind, and which requires no adjustment or shifting of parts thereof to compensate for the changes in the direction or velocity of the wind impinging thereagainst.

A still further object of my invention is to provide a wind power device of simplified construction which is strong and durable and which will be operative in a uniform manner under varying service conditions.

Other objects and advantages will be apparent from the following description, and the novel features of the invention will be particularly outlined in the appended claims.

My invention is illustrated in the accompanying drawing, forming a part of this application, in which—

Figure 1 is a side elevation of a practical embodiment of the invention.

Figure 2 is an enlarged horizontal section through the embodiment of the invention illustrated in Fig. 1, the view being taken substantially along the line 2—2 of Figure 3, Figure 3 is a section along the line 3—3 of Figure 2, and Figure 4 is a section along the line 4—4 of Figure 3.

In carrying out my invention, I make use of a supporting structure which may comprise inclined posts or standards 1 converging together at their upper ends and carrying a head 2. The latter has a vertical bore 3 formed therethrough to extend axially thereof and through this bore depends a vertical shaft 4. The shaft 4 has secured thereon at a determined distance from the upper end a hub 5 which rests upon the head 2 and limits the axial movement of the shaft 4, whereby a portion of the latter extends above the plane of the head 2 and a portion of equal or slightly greater length depends below the level of the head. The arrangement is such that the hub 5 may rotate upon the head 2 without undue friction being occasioned and at the same time may have a limited gyratory motion.

An annular flange 6 is formed on the hub 5 intermediately of the length of the latter. Pairs of cross arms 7, 7 and 8, 8 are secured intermediately to the flange 6 and extend equal distances in opposite directions from the center of the latter, the cross arms of each pair converging slightly from their middle portions toward their outer ends. The cross arms 7, 7 are secured to the under face of the flange 6 at the opposite sides thereof and the cross arms 8, 8 are secured to the upper face of the flange 6 at opposite sides thereof, the respective pairs of cross arms crossing each other substantially at right angles.

A hub 9 which is similar to the hub 5 is secured on the shaft 4 at the upper end thereof and is provided intermediately with a flange 10 to which are secured crossed pairs of cross arms 11, 11 and 12, 12 respectively. The cross arms 11, 11 and 12, 12 are identical in essential respects with the cross arms 7, 7 and 8, 8 and are secured to the flange 10 in such manner that the pairs of cross arms 11, 11 and 12, 12 cross each other at right angles and the vertical planes thereof intersect the planes of the pairs of cross arms 7, 7 and 8, 8 at an angle of approximately 45°. The cross arms 11, 11 are secured intermediately to the under face of the flange 10 and the cross arms 12, 12 are secured intermediately to the upper face of the flange 10.

The cross arms 11, 11 and 12, 12 support concentric annular frame members 13 and 14. The annular frame member 14 is considerably larger diametrically than the frame member 13 and is secured to the cross arms 11, 11 and 12, 12 at their outer ends. The smaller annular member 13 is secured to the cross arms 11, 11 and 12, 12 at points between their intermediate portions and outer ends, as shown. Spacing block 15 are interposed between the cross arms and the annular frame members to effect the positioning of both frame members in the same plane.

The cross arms 7, 7 and 8, 8 likewise carry concentric annular frame members 16 and 17 which respectively are precisely identical in essential respects with the annular frame members 13 and 14 and are associated with the cross arms 7, 7 and 8, 8 in the same manner as the annular members 13 and 14 are associated with the cross arms at the upper end of the shaft 4. Spacing blocks 18 are arranged between the cross arms 7, 7 and 8, 8 to position the annular frame members 16 and 17 in the same plane.

A plurality of vertically disposed vanes are arranged at intervals between the outer and inner annular frame members, being secured at their inner side edges to the inner ring at points equi-distant apart as illustrated to advantage in Figure 2. Each of the vanes 19 has the horizontal sectional contour of an arc of a parabola, the pitch or curve thereof being shortest near its outer side edge. The height of the vanes 19 is such that when the vanes are supported in the manner described with their upper edges in the plane of the rotor frame members 13 and 14 the lower edges of the vanes will terminate in a plane parallel with the plane of the respective sets of rotor frame members and located about the same distance below the annular frame members 16 and 17 as the latter are located below the plane of the frame members 13 and 14. Concentric annular members 20 and 21 which respectively are precisely identical in essential respects with the inner and outer annular frame members heretofore described are secured to the vanes 19 at the lower ends of the latter and are thus supported in concentric relation and in the same plane.

A tubular housing 22 integral with the head 2 depends from the latter in axial alinement therewith and encompasses the shaft 4 for the greater part of its length. A radial and thrust bearing 23 for the shaft 4 is supported at the lower end of the housing 22. The shaft 4 has a reduced end portion 4' extending through the bearing to depend below the latter. A clutch member 24 is secured to the reduced end portion 4' and is formed with a socket 25 in its face, which socket is axially alined with the shaft 4. A shaft 26 which is to be driven at times is arranged with the upper end portion thereof rotatably disposed in the socket 25 and may be supported substantially in vertical alinement with the shaft 4 in any suitable known manner. A clutch member 27 adapted to cooperate with the clutch member 24 is feathered to the shaft 26 and is slidable along the latter into and out of operative engagement with the clutch member 24.

An expansion spring 28 seated in a cage 29 secured to the shaft 26 re-acts against the hub of the clutch member 27 and tends to hold the latter in operative engagement with the clutch member 24. A governor for moving the clutch member 27 out of engagement with the clutch member 24 when a determined rotational speed of the shaft 26 has been attained comprises arms 30, 30 pivotally attached to the cage 29 to engage at their inner ends with a groove 31 in the hub of the clutch member 27 and being provided with weights at their outer ends.

The clutch member 27 also may be moved manually into and out of engagement with the clutch member 24 at will through the agency of any suitable clutch operating mechanism, such as the operating rod 32 connected with an arm 33 movably supported with one end in a peripheral groove 34 formed in the hub of the clutch member 27, the arrangement being such that the clutch member 27 will be moved along the shaft 26 when the rod 32 is actuated.

From the foregoing description of the various parts of the device, the operation thereof may be readily understood. The cross arms and annular members of the rotor frame are preferably made in the form of angle irons in order that a frame structure of relatively great strength may be provided when frame elements of given sizes are employed. The vanes 19 are set at such an angle to radial lines leading from the axis of the rotor shaft 4 as to utilize practically all the effective force of the wind, thereby rotating the shaft 4 to effect a maximum production of power. The wind blowing from any direction will impinge against the vanes located in the proximate part of the rotor and will be deflected inwardly while acting upon the vanes first encountered to occasion a rotation of the rotor, the deflection of the air currents toward the center of the rotor being occasioned by the parabolic curvature of the vanes and the angle at which the vanes are supported in respect to radial lines extending from the axis of the rotor. The air currents deflected from the vanes first encountered will strike succeeding vanes in turn and will continue to impart a torque to the rotor until the vane first encountered has accomplished approximately three quarters of a complete revolution about the axis of the rotor. The wind carrying around the inside of the rotor to the first quarter meets the incoming currents, causing increased wind pressure, and is forced out at the fourth quarter, thus adding extra power to the rotor. The wind thus expelled from the rotor drives the outside wind currents away from that portion of the rotor moving against the wind. A partial vacuum will be created in the rotor and air will be drawn into the rotor at the top and bottom to fill the vacuum resulting from the cyclonic action of the wind within the rotor.

Since the rotor has a bearing at its approximate center and is free to turn about such center, it will act in a gyroscopic fashion and will be maintained in a stabilized condition, irrespective of the direction or velocity of the operating air currents. After the vane has been initially secured to the rotor frame in the manner described, no further adjustments or shifting of the same are required to compensate for change in the direction or velocity of the wind. The rotor will be acted upon in a uniform manner, by air currents moving in different directions. The driven shaft 26 may be operatively connected with the rotor shaft 4 at will in the manner described, whereby the power developed may be communicated through the shaft 26 to a desired place and for use in a desired manner.

Obviously my invention is susceptible of embodiment in forms other than that in which illustrated in the accompanying drawings and I therefore consider as my own all modifications and adaptations of the form of the device disclosed herein which fairly fall within the scope of the appended claims.

I claim:—

1. A wind power device comprising a rotor frame supported for rotation about a vertical axis, and a plurality of vanes carried by said frame in a circular series about the axis of said frame, each of said vanes having the horizontal sectional contour of an arc of a parabola and being arranged upon the frame with the inner edge thereof terminating in advance of the radial plane of the outer edge thereof.

2. A wind power device comprising a rotor frame supported for rotation about a vertical axis, and a plurality of vanes carried by said frame in a circular series about the axis of said frame, each of said vanes having the horizontal sectional contour of an arc of a parabola and being arranged upon the frame with the inner edge thereof terminating in advance of the radial plane of the outer edge thereof, and at an appreciable radial distance from the axis of the frame.

3. A wind power device comprising a supporting structure having a head formed with an axial bore therethrough, a rotor shaft, a hub secured on said shaft at a distance from the upper end thereof, said shaft being arranged to depend through the bore of said head until said hub rests upon the head, a second hub secured upon said shaft at the upper end thereof, cross arms carried by said hub and extending equal distances radially from the hub, vertically aligned annular members carried by the said cross arms, vertically disposed rigid vanes secured to said annular members and depending below the plane of the head of the supporting structure, said vanes having the horizontal sectional contour of an arc of a parabola curved more sharply adjacent to its outer edge than elsewhere along its length and being arranged with its inner edge positioned nearer to the said shaft than the outer edge and in a radial plane in advance of the radial plane of the outer edge.

4. A wind power device comprising a supporting structure having a head formed with an axial bore therethrough, a rotor shaft, a hub secured on said shaft at a distance from the upper end thereof, said shaft being arranged to depend through the bore of said head until said hub rests upon the head, a second hub secured upon said shaft at the upper end thereof, cross arms carried by said hub and extending equal distances radially from the hub, vertically aligned annular members carried by the said cross arms, vertically disposed rigid vanes secured to said annular members and depending below the plane of the head of the supporting structure, a driven shaft supported substantially in axial alignment with the first shaft and adjacent thereto, and a clutch mechanism arranged between the proximate ends of the said shafts.

5. A wind power device comprising a supported rotor shaft, a rotor frame secured to the shaft, vertically disposed vanes carried by the frame, a radial and thrust bearing for the rotor shaft, said bearing having a vertical bore and said rotary shaft having a reduced lower end portion depending through the bore, a second shaft supported substantially in alignment with the rotor shaft and below the latter, a clutch mechanism arranged between the proximate ends of the rotor shaft and the second shaft to establish a driving connection between the shafts normally, and means arranged to be operated when the second shaft is driven at a predetermined speed to operate the clutch mechanism and discontinue the driving connection between the rotor shaft and the second shaft.

6. A wind power device comprising a vertical rotor shaft, a hub secured to the rotor shaft intermediate its ends, a supporting structure including a head provided with a bore, said rotor shaft having the portion thereof below the hub depending through said bore, said hub resting upon the head, whereby said rotor shaft will be supported intermediate its length for free rotory and limited gyratory motion, a second hub secured to the rotor shaft at a point adjacent to the upper end of the latter, a plurality of curved rigid vanes, and means carried by said hubs and depending below the level of said first named hub for supporting said vanes in vertical position and in spaced relation in respect to one another.

EBENEZER H. MANNING.